United States Patent [19]
Lee

[11] Patent Number: 6,087,633
[45] Date of Patent: Jul. 11, 2000

[54] ELECTRIC OVEN

[76] Inventor: Ming-Tsung Lee, P.O. Box 90, Tainan City, Taiwan

[21] Appl. No.: 09/442,087

[22] Filed: Nov. 18, 1999

[51] Int. Cl.[7] ..................................................... A47J 37/04
[52] U.S. Cl. ..................... 219/392; 219/386; 99/421 HV
[58] Field of Search .................................... 219/386, 392; 99/421 H, 421 HV

[56] References Cited

U.S. PATENT DOCUMENTS

| | | | |
|---|---|---|---|
| 3,240,147 | 3/1966 | Farber et al. | 99/421 HV |
| 3,247,779 | 4/1966 | Willman | 99/421 HV |
| 3,248,518 | 4/1966 | Ogle et al. | 99/421 HV |
| 3,329,082 | 7/1967 | Satkunas | 99/421 HV |
| 3,356,012 | 12/1967 | Rosen | 99/421 HV |
| 3,742,839 | 7/1973 | Maley | 99/421 HV |
| 4,770,091 | 9/1988 | Kaughn | 99/421 H |

*Primary Examiner*—Joseph Pelham

[57] ABSTRACT

An electric oven with a baking frame for placing an object to be broiled or baked on it, includes a base, a net, a support frame vertically fitted in one side of the base and having several grooves respectively in two vertical sides, a position frame, a piercing member and a motor. The base has a large recess with four circumferential edges provided with an insert hole in two opposite edges. The position frame vertically fixed in the other side of the base has several pairs of hang holes in an upper portion and a slot formed under each pair of the hang holes corresponds to the grooves of the support frame. After the pointed end of the piercing memer piercing an object is inserted in a shaft hole of the motor, the piercing member is slowly rotated so as to have the object broiled evenly on the oven.

5 Claims, 4 Drawing Sheets

ELECTRIC OVEN

BACKGROUND OF THE INVENTION

This invention relates to an electric oven for boiling or baking an object supported between a support frame and a position frame, with the object pierced on a piercing member placed between the support and the position frame and rotated slowly by a motor for the object to be broiled evenly on the oven.

A known conventional electric oven 1 shown in FIG. 1, mainly includes a base 10, a large recess 11 on an upper surface of the base 10, four circumferential insert edges 12 formed around the recess 11. Then two grooves 13 are formed in two opposite sides of the insert edge 12 with a heat guide rod 14 of continual U-shape placed in the recess 11. Two support rods 15 have both ends fitted in the grooves 13 of the insert edge 12 so as to support the heat guide rod 14 flatly placed in the recess 11. Further, a net 16 is place on the circumferential insert edges 12 to let objects to be broiled or baked placed on the net 16 and heated up by the heat of the heat guide rod 14. After one surface of the object is broiled enough, then the object is turned over to let the other side facing down for broiled.

However, the known conventional electrical oven can only useful for broiling rather small objects, impossible to broil a whole chicken, and in addition, each side of an object has to be turned over after broiled enough.

SUMMARY OF THE INVENTION

The objective of the invention is to offer an electric oven with a baking frame automatically slowly rotated for baking or broiling.

The features of the invention are a support frame and a position frame both vertically fixed on a base, and a piercing member for piercing an object such as a chicken placed between the support frame and the position frame. Then the piercing member with the object to be baked together automatically and slowly is rotated by a motor having a shaft hole fitted with a pointed end of the piercing member and rotated by the motor. A heat guide rod of continual U-shape is placed in a recess of the base for generating heat for baking, with a net placed on the recess for placing small objects to be baked.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
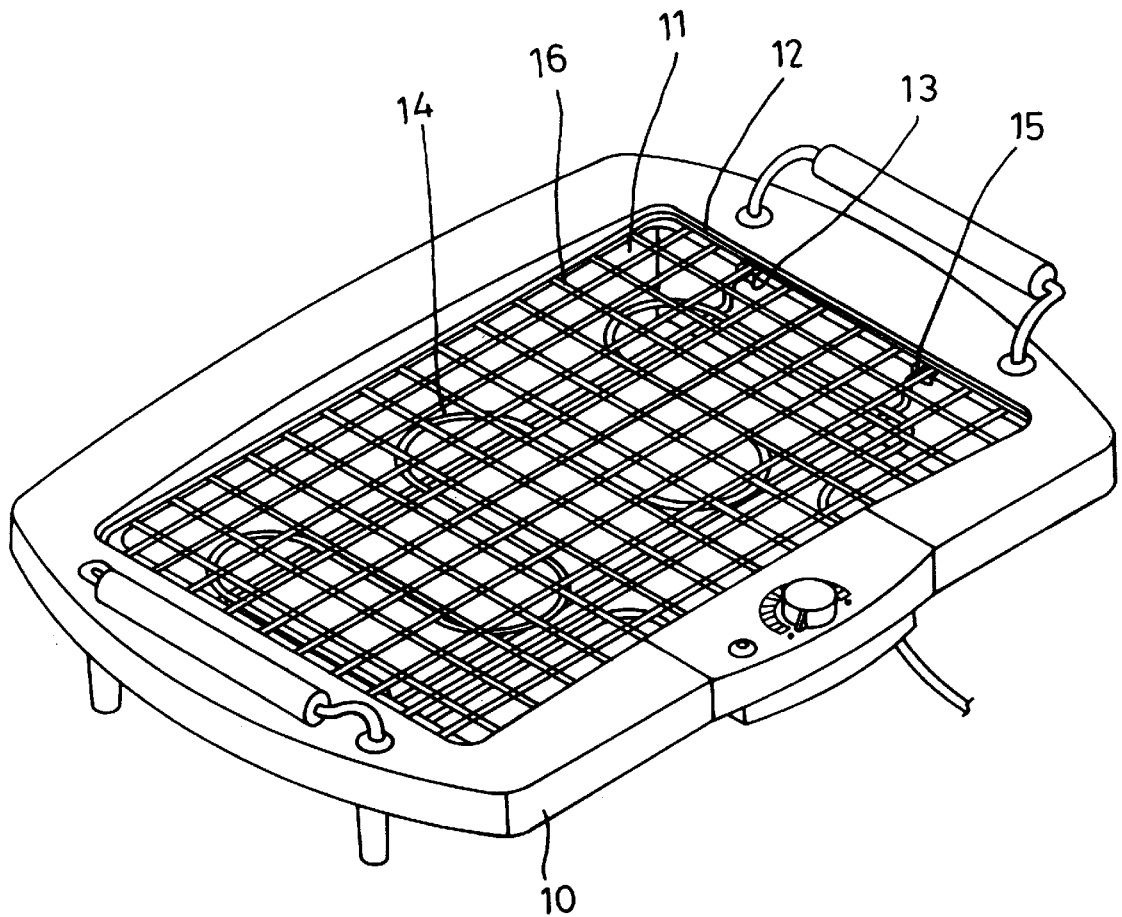
FIG. 1 is a perspective view of a known conventional electrical oven.
Figure 2:
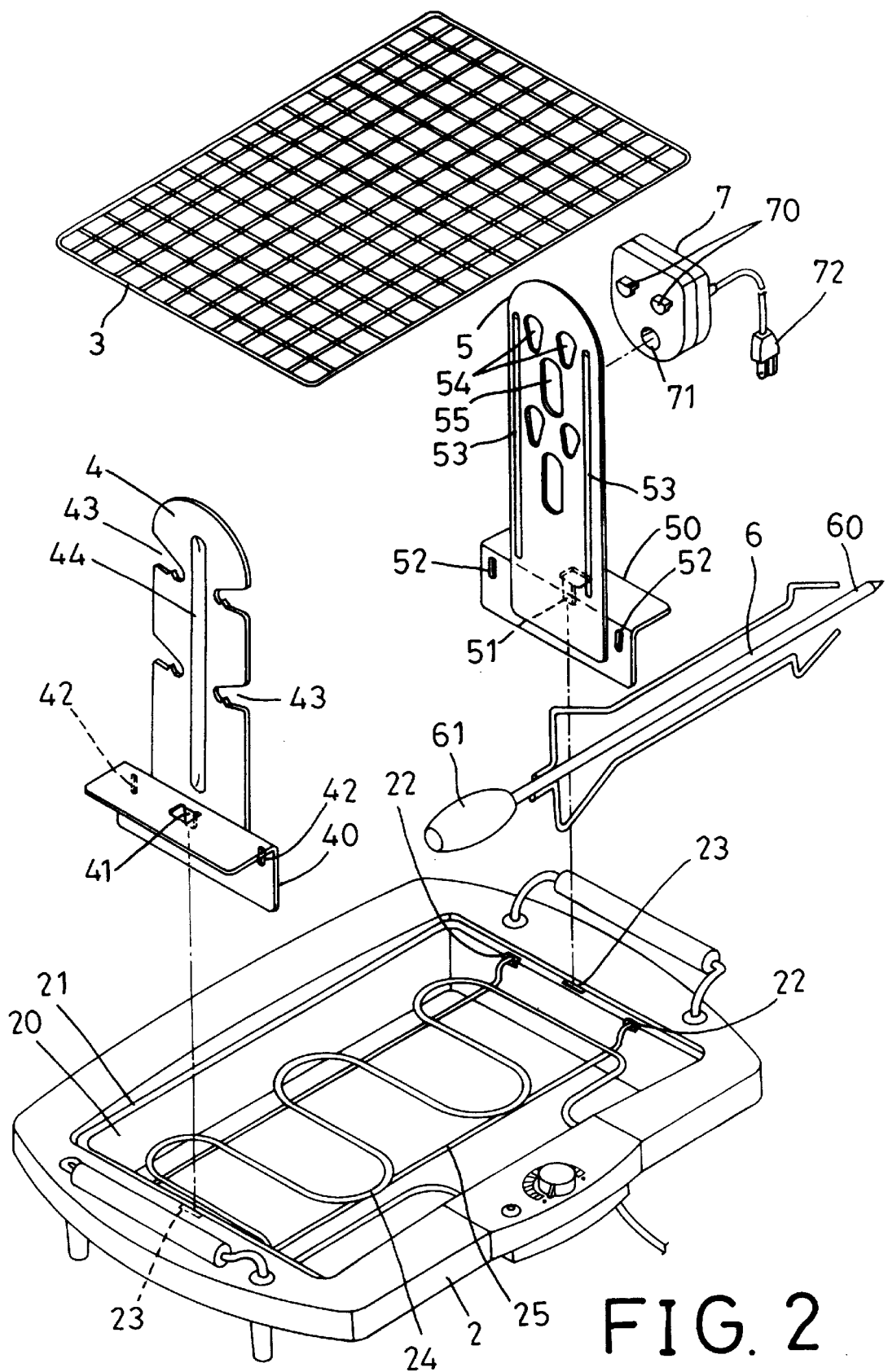
FIG. 2 is an exploded perspective view of an electric oven with a baking frame in the present invention.

A preferred embodiment of an electric oven with a baking frame in the present invention, as shown in FIG. 2, includes a base 2, a net 3, a support frame 4, a position frame 5, a piercing member 6 and a motor 7 as main components combined together.

The base 2 has a large recess 20 formed in an upper surface, four circumferential insert edges 21 formed around the recess 20, two grooves 22 formed respectively in two opposite insert edges 21, and an insert hole 23 bored between the two grooves 22. Further, a heat guide rod 24 of continual U-shape is placed in the recess 20, supported on two parallel rods 25 having both ends fitted in the grooves 22 to keep the heat guide rod 24 stably in the recess 20.

The net 3 has a size large enough to cover the recess 22, placed on the circumferential edges 21.

The support frame 4, which is fitted in one side of the base 2, has an L-shaped base plate 40 with an insert piece 41 extending down, two slots 42 respectively at two sides, and a vertical plate portion provided with several grooves 43 formed in two sides and with a reinforcing vertical rib 44 in the center.

The position frame 5, which is fitted in the other side of the base 2 and aligned opposite to the support frame 4, has an L-shaped base plate 50 with a vertical insert piece 51 extending down from the horizontal portion of the base plate 50 and a slot 52 respectively formed in two sides of the vertical portion of the base plate 50. Further, the position frame 5 has a vertical plate provided with two vertical reinforcing ribs at two vertical opposite sides, several pairs of hang holes 54 in an upper portion and a slot 55 respectively below each pair of the hang holes 54.

The piercing member 6 is placed between the support frame 4 and the position frame 5, having a pointed end 60 and a grip end 61.

The motor 7 is hung on an outer surface of the vertical plate of the position frame 5, having two hang tabs 70 on an inner surface, and a shaft hole 71 below the two hang tabs 70, connected with a wire and a plug 72 to get power.

Figure 3:
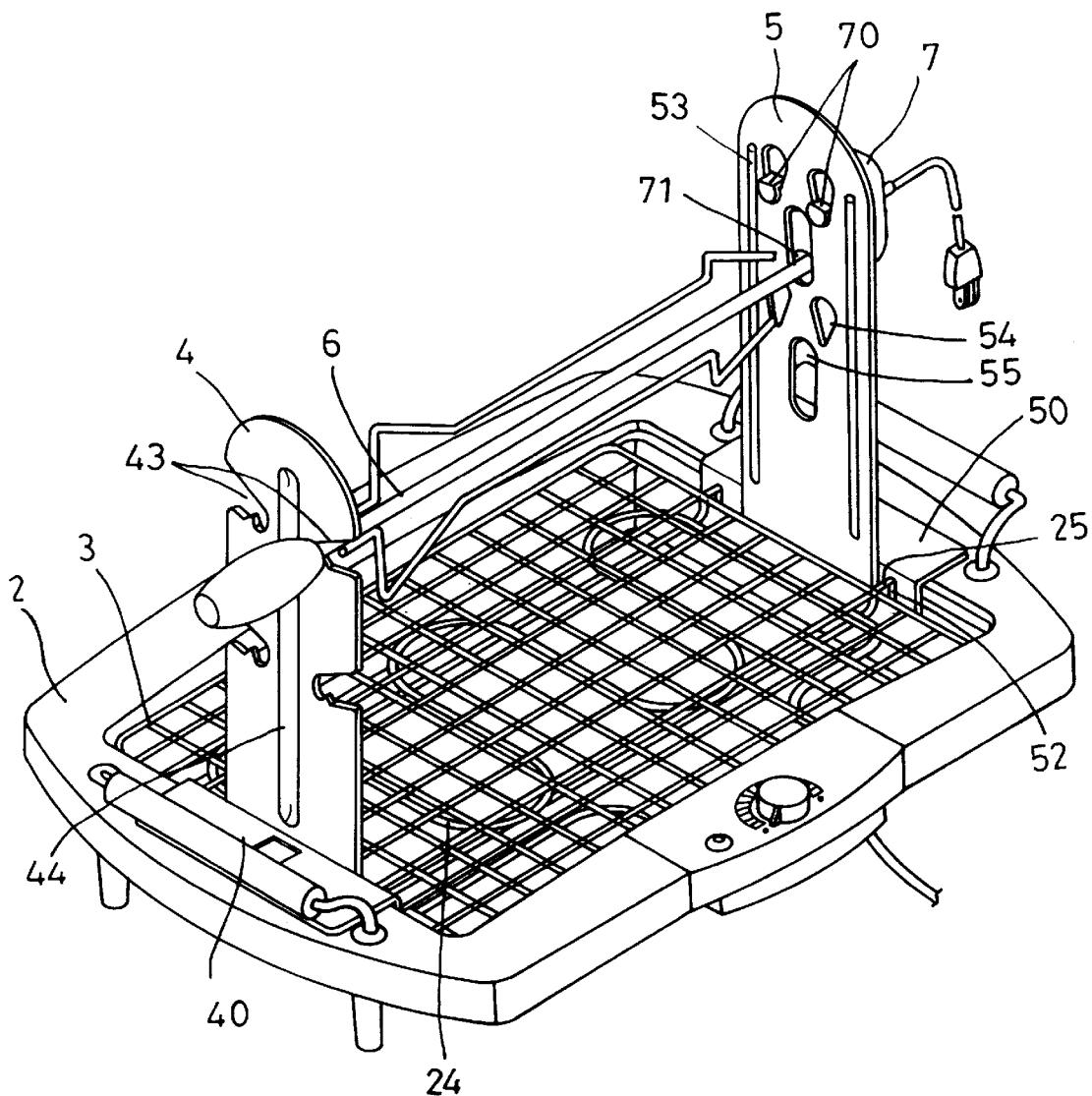
FIG. 3 is a perspective view of the electric oven with a baking frame in the present invention; and, FIG. 4 is a perspective view of the electric oven with a baking frame with an object being pierced on a piercing member and being baked in the present invention.

In assembling, referring to FIGS. 2 and 3, firstly, the two support rods 25 are combined with the support frame 4 and the position frame 5 with both ends of the two rods 25 fitting in the slots 42 and 52 and then in the grooves 22 of the insert edge 21 of the base 2. Then the insert vertical pieces 41, 51 of the base plates 40, 50 respectively fit in the insert holes 23 of the insert edge 21 of the base 2, securing the support frame 4 and the position frame 5 with the base 2. Next, the net 3 with its circumferential edge contacting the insert edge 21 is placed on the recess 20, and the motor 7 is hung on the vertical plate of the position frame 5 at a proper position to fit the two hang tabs 70 tightly in one pair of the hang holes 54. Then the shaft hole 71 of the motor 7 is aligned to one of the slots 55 so that the pointed end 60 may protrude through the slot 55 and into the shaft hole 71 tightly.

Figure 4:
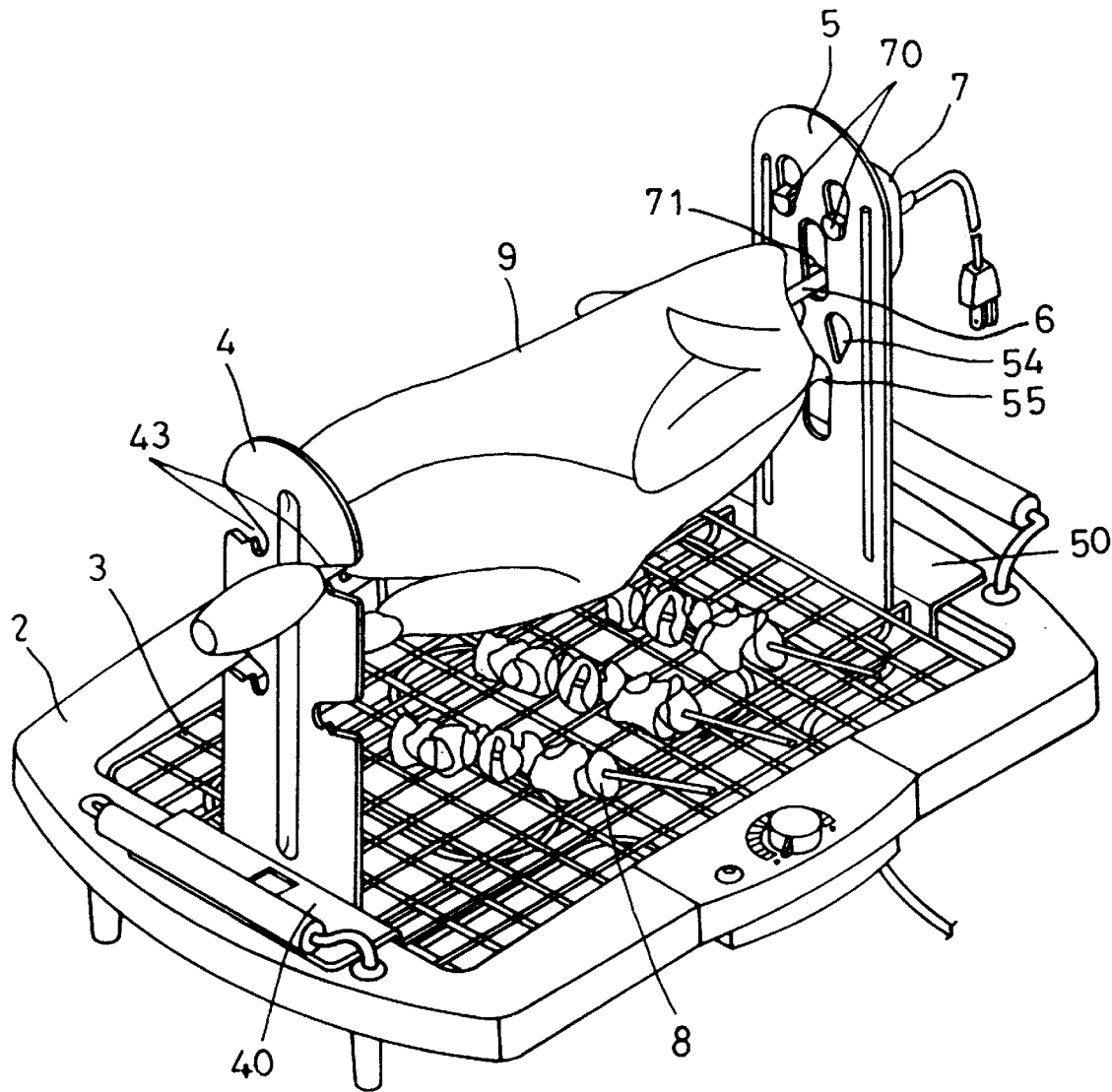

In using, referring to FIG. 4, small objects 8 such as meat or sausages may be placed on the net 3 to be baked by the heat guide rod 24. A large object 9 such as a whole chicken may be pierced through the piercing member 6 and positioned between the support frame 4 and the position frame 5. Then the pointed end 60 of the piercing member 6 is tightly fitted in the shaft hole 71 of the motor to let the chicken automatically rotated for being baked evenly. In addition, the large object 9 can be adjusted in its height from the base 2 by altering the positioned on the support frame 4 and the position frame 5.

While the preferred embodiment of the invention has been described above, it will be recognized and understood that various modifications may be made therein and the appended claims are intended to cover all such modifications which may fall within the spirit and scope of the invention.

What is claimed is:

1. An electric oven with a baking frame comprising a base having a large recess in an upper surface, a four circumferential insert edges formed around said large recess, two grooves respectively formed in two opposite insert edges, a heat guiding rod of a continual U-shape placed in said large recess on two straight parallel rods, which have both ends fitting in said grooves of said insert edges to support said heat guide rod stably on said recess, and a net placed on said base;

And characterized by said base having an insert hole respectively in two opposite sides; a support frame fitted in one side of said base and having an L-shaped plate in a lower portion with a vertical insert piece extending down from the horizontal portion, and a vertical plate extending up from said L-shaped plate and having several grooves respectively in two sides; a position frame fitted in the other side of said base and aligned opposite to said support frame and having an L-shaped base plate with an insert vertical piece extending down from the horizontal portion and a vertical plate extending up from said L-shaped base plate and also having several pairs of hang holes in an upper portion and a slot respectively under each said pair of hang holes; a piercing member to be placed between said support frame and said position frame; a motor with a shaft hole hung on an outer surface of said vertical plate of said position frame; an object to be baked being pierced through said piercing member and placed between said support frame and said position frame, with said pointed end of said piercing member fitted tightly in said shaft hole of said motor, which is powered to rotate slowly said piercing member with the object being baked by said heat guide rod in said recess.

2. The electric oven with a baking frame as claimed in claim 1, wherein said support frame and said position frame both have two slots respectively in the vertical portion of said L-shaped base plate, so that said two support rods under said heat guide rod may have their both ends fitting in said two slots and further in said grooves of said base, securing said support frame and said position frame with said base.

3. The electric oven with a baking frame as claimed in claim 1, wherein said vertical plate of said support frame and said vertical plate of said position plate respectively have one or more vertical reinforcing ribs to strengthen both said support frame and said position frame.

4. The electric oven with a baking frame as claimed in claim 1, wherein said vertical plate of said support frame has several grooves formed respectively in two sides in an upper portion, and said vertical plate of said position frame has several slots aligned to said grooves of said support frame for said piercing member to be selectably placed at a proper height from said base.

5. The electric oven with a baking frame as claimed in claim 1, wherein said motor has several pairs of hang tabs on an outer surface to fit in one pair of said hang holes of said vertical plate of said position frame.

* * * * *